June 17, 1941.  R. RING  2,246,319
WELL SURVEYING INSTRUMENT
Filed Jan. 13, 1940
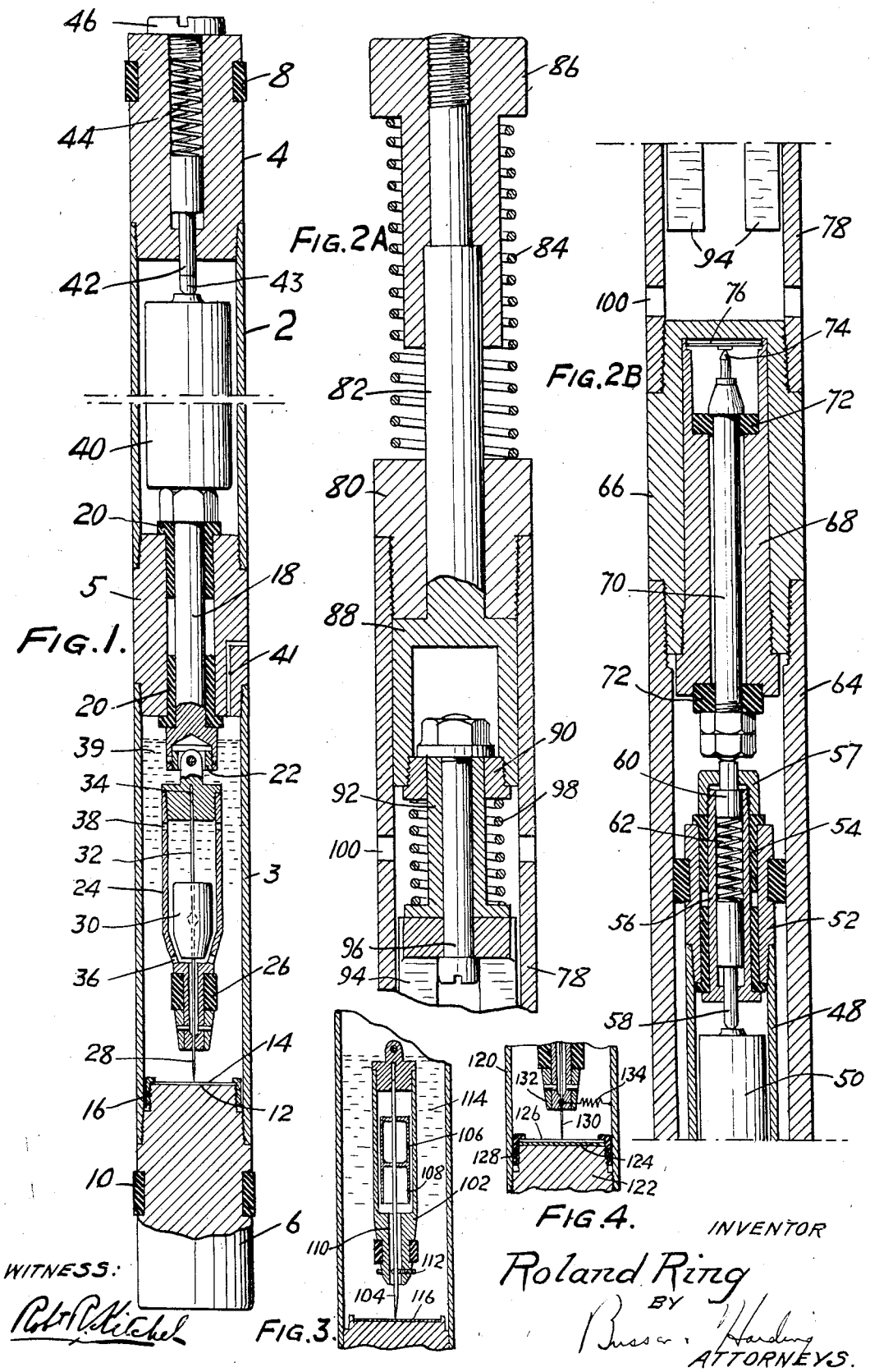
INVENTOR
Roland Ring
BY
ATTORNEYS Patented June 17, 1941

2,246,319

UNITED STATES PATENT OFFICE 2,246,319

WELL SURVEYING INSTRUMENT

Roland Ring, Houston, Tex., assignor to Sperry-Sun Well Surveying Company, Philadelphia, Pa., a corporation of Delaware Application January 13, 1940, Serial No. 313,706

9 Claims. (Cl. 33—205.5)

This invention relates to a well surveying instrument, and more particularly to an instrument in which a record of inclination is made by the passage of an electric current through a record member.

It is desirable that well surveying instruments, particularly of the type merely indicating inclination, should be of quite small diameter so as to pass through small drill stems. Inasmuch as a protective casing is always required to protect the operating parts of the instrument against mud pressures and must be of sufficient wall thickness to withstand high pressure, the maximum diameter for the operating parts of an instrument which may be used in a small drill stem becomes quite small. Clockwork mechanisms or the like, designed to control the operation of the instrument can only be made with great difficulty in small sizes consistent with reliability of operation.

It is the primary object of the present invention to provide a well surveying instrument which may be either of directional or inclinometer type which will operate satisfactorily despite the absence of any timing mechanism. Specifically, this result is accomplished by permitting current to flow continuously but in such amount that the true record made when the instrument comes to rest will not be obliterated by other markings. A further object of the invention, illustrated by a modification herein, involves the provision of means for limiting the period of current flow, preferably by means of the use of a go-devil.

In one form of the invention, the current is supplied not by a battery, but by a cell in which the record member forms an electrolyte carrier.

The above and other objects, particularly relating to details, will become apparent from the following description, read in conjunction with the accompanying drawing, in which:

Figure 1 is a vertical section through a preferred form of the instrument;

Figure 2A is a vertical section through the upper portion of a modified type of instrument;

Figure 2B is a vertical section through a portion of the instrument immediately below that illustrated in Figure 2A;

Figure 3 is a fragmentary section of another modification in which interruption of the making of a record is produced by accumulation of gas liberated by electrolytic action; and Figure 4 is a fragmentary section showing a modified form of the invention in which an electric current is produced without the use of batteries.

Referring first to Figure 1, there are illustrated therein the operating parts of a surveying instrument designed to be located within a protective casing in the usual fashion adapted to be lowered into a bore hole on a wire line or in go-devil fashion. When used in the latter fashion, the instrument may be dropped through a drill stem to be caught in a suitable sub or arrestor at the bottom thereof, so that it may be removed from the hole upon withdrawal of the drill stem.

The instrument comprises two tubular portions 2 and 3, respectively, joined by a connecting member 5 and closed by upper and lower plugs 4 and 6, respectively. These plugs may be provided with shock absorbing rings 8 and 10 designed to closely fit within the protective casing (not shown).

The lower plug 6 is provided with a reduced inner end having a flat face 12 on which is adapted to be clamped a disc record member 14 by means of a flanged ring 16 threaded on the plug. The record member 14 may be of the nature hereafter described adapted to be marked by the prolonged passage of an electrical current through it.

The connecting member 5 is provided with a central bore in which a pin 18 is supported in insulated fashion by means of insulating sleeves 20. The pin 18 at its lower end carries, by means of transverse pivot pins, a gimbal ring 22 which, in turn, carries on pins at right angles with those just mentioned a pendulum 24. The lower reduced end of this pendulum is provided with an insulating ring 26 designed, when the pendulum tilts, to avoid a contact of the metal of the pendulum with the walls of the instrument to prevent any short circuit of the batteries.

Extending with a free sliding fit through a bore in the lower end of the pendulum 24 is a pin 28 having a reduced but rounded end adapted to bear upon the record member 14. This pin at its upper end is secured to a float 30 of cork or similar material. An extension 32 of the pin is guided in a bore 34 in the top plug of the pendulum 24. Openings 36 and 38 are provided in the pendulum to afford access of liquid 39 with the interior of the pendulum to act upon the float 30. When the instrument is in its upright position and an insulating liquid, such, for example, as kerosene, is filled into the chamber 3, the buoyancy of the float 30 will be such that, though the pin 28 will not be raised from the record member 14, its pressure thereon will be very slight, preferably amounting to only a few milligrams. Thus frictional resistance due to movement of the pin over the surface of the record member is reduced to a negligible amount. Suitable vent openings 41 may be provided to facilitate filling and to take care of liquid expansion due to the rise in temperature.

Within the portion 2 of the housing there are located one or more batteries indicated at 40. If a plurality of these are used they may be arranged in series in the usual fashion common in searchlights, the bottom of the lowermost battery making contact with the upper end of the pin 18 and the positive pole of the upper battery making contact with a pin 42, having a current limiting resistance section 43, pressed downwardly by a spring 44, which is retained in a bore of the top plug 4 by means of a screw 46. The batteries may be of the usual flashlight type, provided with pasteboard coverings to insulate them from the metallic tube 2.

The record member 14 may take various forms, but preferably that of a member containing a material which, upon electrolysis will give a color change to indicate the point at which electrolysis is taking place. For example, a preferred form of record member consists of a disc of gelatin coated paper at least the gelatinized surface of which has been impregnated with blue ferrous ferricyanide or ferric ferrocyanide and a soluble electrolytic salt. This may be accomplished, for example, by precipitating the blue pigment in the gelatin coating as hereafter described. In the final dry product there should be present a soluble salt which, upon moistening will provide an electrolytic solution. Sodium chloride, for example, is satisfactory. If any one of these blue precipitates is formed in the record member, there will be produced alkali at a cathode in contact therewith by decomposition of the soluble salt. This alkali will decolorize the precipitate, with the resulting formation of a white or brown spot.

In the operation of the instrument, for example, a record member of the aforesaid type is moistened and secured to the plug 6 by means of the ring 16. The chamber 3 is then filled with a liquid, such as kerosene, for the purpose of buoyantly decreasing the pressure of the pin 28 on the record member, and the instrument is then assembled. Until it is to be used, it may be turned upsidedown, whereupon the pin 28 will drop away from the record member 14.

When the instrument is to be used, it may be lowered or dropped into a drill stem within its protective casing. As soon as the instrument is turned right side up, the pin 28 will, of course, contact with the moistened record member 14, but if the instrument is kept in motion, as will be the case during lowering, the pin 28 will move about on the record member and, if proper size batteries are used, the total amount of current passing at any spot during such movement will be insufficient to produce any substantial marking of the record member or, at any rate, only such marking as will be evidently due to the period of lowering and will be insufficient to obliterate the actual record made when the instrument comes to rest. The instrument is permitted to rest for a sufficient length of time for the current flowing to produce a mark on the record member. In the case of the record member referred to above, this mark will be a white or brown spot in a blue background. The pin is preferably sufficiently pointed to make a minute and accurately readable spot. The record member is preferably inscribed with a series of circles indicative of the angle of slope, so that the angle when the record is made may be read directly.

With the use of, say, three batteries and a moistened sheet which offers a substantial amount of resistance, a good record may be made by holding the instrument at rest for not less than a period of one to three minutes. Under these conditions, the lowering of the instrument will produce no discernable marking, because the pendulum will not rest in any one position sufficiently long to permit to occur enough electrolysis to discolor the pigment.

As soon as sufficient time has elapsed to permit a record to be made, the instrument will be removed from the bore hole either by means of a wire line, or by withdrawal of a drill stem in the lower portion of which it rests. During such raising the pendulum will again be in constant motion, and no perceptible record, or at least no obliterating record, will be made. It is, of course, immaterial whether or not slight streaks or other markings are made, so long as the desired record mark is sufficiently outstanding to be readily recognizable as such.

Instead of making a single record, there may be made, for example, three records by turning a drill stem within which the instrument rests through steps of approximately one-third revolution each, and permitting it to remain in each position sufficiently long to form a record. This has a twofold advantage. First, averaging of the three records will correct for any local non-conformity of the drill stem with the axis of the hole. Second, even if the instrument should happen to be at rest during some part of the lowering or raising operation sufficiently long to produce a record, the record so produced can be easily distinguished from the desired records by reason of the similarity of the latter.

It will be obvious that the type of record member used may take various forms. Preferably it is provided with a quite smooth surface, such as is afforded by a gelatin coating, so that it offers a minimum of resistance to swinging of the pendulum, which should have a quite substantial mass in comparison with the force exerted by the pin 28 upon the record member. The gelatin coating also serves, in the event that kerosene or the like is used in the record chamber, to prevent saturation of the paper with an insulating liquid which might interfere with the production of a record. The kerosene or similar liquid is desirably provided not only to act buoyantly upon the float carried by the pin, but also to provide for effective damping of the pendulum. It also keeps the spot small in diameter and hence more readily readable.

The discolorable material of the record member may take many forms, as will be evident to those skilled in the art from a description of certain preferred forms. In general, it may be stated that the formation of anodic or cathodic products may be utilized to produce recognizable changes in the record member, as in the example indicated above in which the formation of an alkali at the cathode is utilized to discolor a blue pigment.

A specific preferred type of record member may be provided by utilizing gelatin coated paper, first impregnating the gelatinized face of the paper with a solution of a ferrous salt, for example, by contact with a blotting paper moistened with this salt solution, and then precipitating ferrous ferricyanide by treating this paper with a solution of potassium ferricyanide.

Instead of precipitating ferrous ferricyanide, there may be precipitated in the gelatin coating ferric ferrocyanide. Other colored ferrocyanides or ferricyanides may be equally well used, such as, for example, copper ferrocyanide or uranyl ferrocyanide. Other pigments sensitive to the presence of alkalies or acids (the latter being formed at an anode) may be used, or, any one of the well known indicators may be used as a dye in the record member to produce the record. For example, if the record member is impregnated with phenolphtholein and a neutral salt, such as sodium chloride, and the pin is made the cathode, a bright red spot will appear at the location occupied by the pin when the record was made. The spot formed by the use of phenolphtholein disappears gradually, due to absorption of carbon dioxide from the atmosphere. However, other indicators, such as methyl red or methyl orange, may be used.

Preferably the record member has printed on it concentric circles to indicate the degree of inclination directly, though it may be read by association with a suitable engraved transparent scale to obtain the inclination. Degree circles may be printed thereon, though this is somewhat difficult in the case of a gelatin surfaced paper, or may be readily produced thereon photographically, since the pigments may be produced by various well known toning processes. For example, a sensitized paper, such as bromide paper, may be printed, either by projection or contact printing, through a negative which is transparent except for the circles indicating degrees. In such case, development of the paper and fixing will result in a sheet which will contain a black silver deposit except for the circles, which will be white. This black deposit may be readily converted into ferrocyanides by conventional toning processes, for example, by treatment of the finished print with a ferricyanide solution and then, after washing, with a ferric salt so that a blue deposit of ferric ferrocyanide will be substituted for the black silver deposit. The silver salt formed in the process may be removed by fixing. Standard works on photographic toning will indicate quite numerous variations of this procedure, including, for example, the deposition of dyes in the form of lakes which may be bleached or discolored by various electrolytic products.

The record member may be normally in a completely dry form and rendered conductive to current by moistening. Alternatively it may contain a hygroscopic material, such as glycerine, or a hygroscopic salt, such as calcium chloride, which will maintain it conductive even when it is substantially dry to the touch. The number of batteries used will, of course, depend upon the conductivity of the record member and the sensitivity of the indicating material. In general, it may be said that the source should provide a current sufficient to produce substantial markings of the record member only when the pendulum is at rest for a prolonged period, but insufficient to produce markings of record obliterating character while the pendulum is in motion during the lowering of the instrument. Because different degrees of moistening may produce substantial variations in the resistance of the record member and hence the current flowing if that is the only substantial resistance in the circuit, it is desirable to insert in the circuit, for example, at 43, a fairly high resistance by which the value of the current will be limited. The current necessary to produce a marking is only of the order of a fraction of a milliampere and hence a resistance of several thousand ohms may be used for the purpose of avoiding excessive current flow under abnormal conditions.

A record which is made electrolytically in this fashion will tend to become a spot of continuously increasing diameter as the current continues to flow. Under some circumstances, and particularly when the instrument is dropped in a drill stem, it is possible that the drill stem may not be raised immediately and may remain during prolonged subsequent periods in a state of rest. Under such conditions, the record which is desired may become progressively indefinite by the continued flow of current and the accompanying diffusion of cathodic or anodic products, or other records might be made which would be confused with the desired record. Accordingly, it is sometimes desirable that the current flow should be interrupted after the record is made. This may be accomplished by the use of the apparatus of modified form, particularly illustrated in Figures 2A and 2B.

The lower portion of Figure 2B illustrates what is, in effect, a modification of the upper portion of the instrument of Figure 1, the tube 48 corresponding to the tube 2 and containing one or more batteries 50 equivalent to the battery or batteries 40. It will be understood that below the tube 48 and the batteries there are precisely the same elements as are found in Figure 1. In this case, however, the circuit of the batteries is subject to interruption and accordingly the upper portion of the instrument is modified and it is located within a protective casing 64 of modified form.

A battery chamber formed by the tube 48 is closed by a plug 52 which is bored and has supported in the bore through the medium of insulated sleeves 54 a tube 56 on which is threaded a nut 57 and which contains a spring 62 urging a downwardly extending plunger into engagement with the central pole of the upper main battery 50 and an upwardly extending plunger 60 into engagement with a contact pin 70. The upper portion of the protective casing 64 is closed by a plug 66, which is provided with a central opening in which is threaded a sleeve 68 carrying the pin 70 insulated from it by the insulating washers 72. At the upper end of the pin 70 is a contact making extension 74 on which rests a disc 76, fitting loosely in an enlarged bore at the upper end of the sleeve 68. The casing 48 rests on a conducting member (not shown) at the bottom of the protective casing, and it will be evident, therefore, that so long as the disc 76 rests on the contact pin 74 and engages a side of the bore in which it is located, a circuit will be completed from the positive pole of the battery through the pins 58 and 60, the pin 70, the disc 76 and the protective casing to the bottom plug such as 6, through the record disc and the pendulum and to the outer shell of the lowermost battery. This circuit, however, can be interrupted merely by lifting the disc 76 out of contact with the pin 74.

To accomplish this end, the disc 76 is made of iron or other magnetic material, and the plug 66 and sleeve 68 are made of bronze or other non-magnetic material. Above the plug 66 there is located a tube 78 surmounted by a cap 80 through which passes a pin 82 urged upwardly by a spring 84 reacting between the cap 80 and a member 86 threaded on the top of the pin 82. A head 88 limits the upward movement under the action of the spring 84 and carries a nut 90 bored to receive a sleeve 92 which carries a magnet 94 through the medium of a pin 96. A spring 98 is interposed to provide a cushion to secure proper operation. Openings 100 are provided in the tube 78 to permit free entry of mud into the chamber containing the magnet 94. This magnet 94 should be of one of the well known materials capable of providing a very powerful permanent magnet so as to insure successful operation.

In the operation of this form of device, it is used identically with the device of Figure 1, in that it may be kept inoperative by maintaining it in an inverted position and will be prevented from making a record as it is lowered, preferably by dropping, into a drill stem, by reason of the continuous motion. After it is permitted to remain in its ultimate position sufficiently long to make a record, a go-devil may be dropped through the drill stem of sufficient weight to compress the spring 84 to bring the magnet 94 into contact with the upper end of the plug 66. Since the go-devil may be of any desired weight, for example, sufficient to fully compress the spring 84 to the extent that the member 86 will engage the cap 80 and it is nevertheless desirable that the magnet should not be forced against the bronze plug 66 sufficient to damage it, the spring 98 is provided to furnish a cushioning action. When the magnet is brought in contact with the member 66, the disc 76 will be attracted and lifted from contact with pin 74 and accordingly the electrical circuit is interrupted. Thus, even though a position of rest is maintained for an extended period, no further flow of current will result and the instrument may be withdrawn after a considerable period and the record will nevertheless be a proper one.

In Figure 3 there is illustrated a further modification in which liberation of gas is used to break the electrical circuit. This modification comprises essentially a minor change in the form of the pendulum of Figure 1, and there is illustrated in Figure 3 only such modification of the pendulum. It will be understood that the remaining parts of the instrument are the same as those illustrated in Figure 1.

In this case, the pendulum 102 has located within it the vertically slidable pin 104, which is provided with a float 106, which may be in the form of a hollow chamber or a cork, or the like, and is additionally provided with a skirt 108, providing, when the instrument is in upright position, a chamber open at the bottom, but closed at its top. The pin passes through a quite large opening, indicated at 110, and is centered by means of three centering screws, indicated at 112, which are backed off the pin just sufficiently to permit it to slide freely. The chamber in which the pendulum rests contains, as in the other case, kerosene or the like, above the record member 116.

In the operation of this instrument when it is inverted the chamber 108 will become filled with liquid, and when the instrument is inverted at most only a negligible amount of air can possibly enter this chamber if the record chamber is substantially filled with liquid. As the electrolysis takes place, hydrogen gas will be liberated at the pin which constitutes the cathode and will rise through the passage 110, collecting in the chamber 108, and eventually displacing the liquid therefrom to such extent that the pin will be floated. As soon as this occurs, the electrical contact is, of course, broken.

Since the gas accumulates relatively slowly, it is preferable in this type of instrument to turn the drill stem containing it to produce three records, as described above. In such case, sufficient gas will be produced to break contact, and at the same time, none of the records need be made through so long a period as will result in too much enlargement by diffusion of the cathodic products.

The invention may also be embodied in a modification in which no batteries need be used, the record member providing the electrolyte to form a voltaic cell adapted to generate current in a circuit completed through a pendulum and the casing. Such an embodiment is illustrated in Figure 4, which is a fragmentary view illustrating only certain parts associated with the record member.

In this modification, the casing of the instrument is indicated at 120. A plug 122, corresponding to the plug 6 of the modification of Figure 1, closes the lower end of this casing and is adapted to carry a composite record member consisting of a backing sheet of an electro-positive metal 124, such as zinc, faced with an impregnated paper sheet 126, the nature of which will be explained directly. To secure this composite record member upon the plug 122, an insulating ring 128 is provided, the ring being of insulating material so as to avoid a short circuit which would give rise to damaging corrosion. Adapted to engage the surface of the record member 126 is a pin 130, carried by a pendulum 132, the pin and pendulum being of the same construction as illustrated in Figure 1, and being enclosed within a chamber, which preferably contains a buoyant liquid, as in the case of the first modification. In this case, however, instead of having the pendulum connected to a battery, it may be connected directly to the casing, though preferably the connection is made through a current limiting resistance, indicated in diagrammatic fashion at 134. From the mechanical standpoint, this resistance is, of course, connected between the casing and a supporting gimbal arrangement of the type illustrated in Figure 1. The two sheets 124 and 126 may be secured together. However, that need not be the case, and they may be merely superimposed and secured to the plug by means of the ring 128.

The sheet 126 in this case will have, at least at its upper face, as in the case of the preceding modifications, a substance which can be marked by an electrolytic decomposition resulting from the flow of current. For example, the face may contain a colored ferrocyanide of the type previously described or, alternatively, an indicator. The record sheet 126 in this case is impregnated with a neutral alkali salt, for example, potassium or sodium chloride, and is moistened and caused to remain moist, as previously described in connection with the other modifications. Under such conditions, if the pin 130 is relatively negative with respect to the metal of the plate 124, being formed, for example, of platinum or the like, there will be provided a cell having as its anode the pin 130, as its cathode the plate 124, and as its electrolyte the neutral salt solution just mentioned. If the circuit is completed as described, a concentration of alkali will result in the vicinity of the cathode (the destination of the cations K or Na) i. e., the pin 130, and the substance sensitive to this alkali will be decomposed or modified to produce a marking of the same nature as that produced in the modifications involving the use of separate batteries. As in the case of such modifications, a visible marking requires some time for its formation, and consequently the use of the apparatus is the same as heretofore described. Because of the small area of the pin 130 in contact with the sheet 126, the cell will effectively have a hydrogen cathode. Pin 130 should preferably be terminated by a metal for which the hydrogen overvoltage is very low, such as platinum. Furthermore, the metal used to form the plate 124 should be more positive than hydrogen.

By the use of the modification just mentioned, the necessity for the provision of batteries is eliminated, and the instrument quite substantially simplified.

It will be evident that various changes may be made in the embodiments of the invention without departing from its scope as defined in the following claims.

Where reference is made to "substantially continuous" flow of current in the claims, it is meant that the flow referred to is uninterrupted for any substantial time during the specified period.

What I claim and desire to protect by Letters Patent is:

1. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, means providing a closed electrical circuit including the pendulum and record member, and means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole.

2. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright but being out of contact with said record member when the instrument is inverted, means providing a closed electrical circuit including the pendulum and record member, and means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole.

3. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, means providing a closed electrical circuit including the pendulum and record member, means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole, and means for opening said circuit after a record is made.

4. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, means providing a closed electrical circuit including the pendulum and record member, means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole, and means for opening said circuit after a record is made, said last means comprising a magnetic element in said circuit and a magnet movable to a position to attract said magnetic element to break said circuit.

5. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, a liquid surrounding said pendulum and serving by its buoyant action on said portion of the pendulum to reduce the effective pressure of said portion upon said record member, means providing a closed electrical circuit including the pendulum and record member, and means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but inifficient to produce markings of record obliterating character while the pendulum is in motion during movements of the instrument along a hole.

6. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, a liquid surrounding said pendulum and serving by its buoyant action on said portion of the pendulum to reduce the effective pressure of said portion upon said record member, means providing a closed electrical circuit including the pendulum and record member, and means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole, said element being out of contact with said record member when the instrument is inverted.

7. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, means providing a closed electrical circuit including the pendulum and record member, means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole, said last means being operated by the accumulation of gas due to electrolytic decomposition.

8. A well surveying instrument comprising a casing adapted to enter a bore hole, means for supporting therein a record member capable of being marked electrolytically by the passage of an electric current, a pendulum having variable location relative to and adjacent said record member depending upon inclination of the casing, said pendulum having a portion constantly in contact with said record member when the instrument is upright, means providing a closed electrical circuit including the pendulum and record member, means providing a substantially continuous flow of current in said circuit while the instrument is being lowered in a hole and during a subsequent rest period, said current being sufficient to produce substantial marking of said record member at the contact of said pendulum portion and record member only when the pendulum is at rest for a prolonged period but insufficient to produce markings of record obliterating character while the pendulum is in motion during movements of the instrument along a hole, and means for opening said circuit after a record is made, said last means comprising a pair of elements, at least one of which is magnetized, one of said elements being in said circuit and the other of said elements being movable to a position to attract the first mentioned element to break said circuit.

9. A well surveying device comprising an elongated casing adapted to enter a bore hole, a record member adapted to be marked by the passage of an electric current, means for supporting said record member within the casing, a pendulum supported for universal pivotal movement, a contact member movable lengthwise of the pendulum and arranged to engage said record member in various positions of the pendulum, means for causing said contact member to exert a pressure less than its weight on said record member, and means for producing a flow of current through the contact and record members to mark the latter.

ROLAND RING.